(12) United States Patent
Tzou et al.

(10) Patent No.: US 8,039,560 B1
(45) Date of Patent: Oct. 18, 2011

(54) LOW DIELECTRIC BROMINATED RESIN WITH A SYMMETRIC OR SATURATED HETEROCYCLIC ALPHATIC MOLECULAR STRUCTURE AND THE PREPARATION THEREOF

(75) Inventors: Ming Jen Tzou, Taipei County (TW); Chi Cheng Chen, Taipei County (TW); Chih Hong Chen, Taipei County (TW)

(73) Assignee: Nan Ya Plastics Corporation, Taipei (TW)

( * ) Notice: Subject to any disclaimer, the term of this patent is extended or adjusted under 35 U.S.C. 154(b) by 44 days.

(21) Appl. No.: 12/752,450

(22) Filed: Apr. 1, 2010

(51) Int. Cl.
*C08L 63/04* (2006.01)
(52) U.S. Cl. ......... 525/481; 525/503; 525/504; 525/507
(58) Field of Classification Search .................. None
See application file for complete search history.

(56) References Cited

U.S. PATENT DOCUMENTS

| | | | |
|---|---|---|---|
| 5,073,605 A | 12/1991 | Hallgren et al. | |
| 5,262,491 A | 11/1993 | Jain et al. | |

FOREIGN PATENT DOCUMENTS

JP 7-157546 A * 6/1995

OTHER PUBLICATIONS

Allan S. Hay, Polymerization by Oxidative Coupling: Discovery and Commercialization of PPO and Noryl Resins, Journal of Polymer Sciences, 1997 p 505-517, vol. 36.

* cited by examiner

*Primary Examiner* — Robert Sellers
(74) *Attorney, Agent, or Firm* — Ming Chow; Sinorica, LLC

(57) ABSTRACT

The present invention provides a brominated epoxy resin, which has a molecular segment of low polarity in the polymer chain, while the molecular segment of low polarity is attributed to the symmetric or saturated cyclic alphatic molecular structure with low "molecular dipole moment" characteristics; making a printed circuit board for high frequency signal transformation applications needs a proper copper clad laminate which processes the properties of a low dielectric constant and of a low dissipation factor; a copper clad laminate can meet above requirements by using the inventive resin as a laminate binder. The inventive resin is prepared by the following steps:

1. Reacting a 2,6-disubstituted mono-phenol compound (A) with an aldehyde or a cyclic diene compound (B), so as to obtain a bisphenol compound (C) having a high symmetry or saturated aliphatic heterocyclic structure;
2. Reacting the resultant symmetric or saturated cyclic diphenol compound (C) with epichlorohydrin for an epoxidation reaction to obtain an epoxy resin (D); and
3. Reacting the resultant epoxy resin (D) with a bromine-containing phenolic compound (E) to obtain the inventive novel brominated epoxy resin (F).

8 Claims, No Drawings

LOW DIELECTRIC BROMINATED RESIN WITH A SYMMETRIC OR SATURATED HETEROCYCLIC ALPHATIC MOLECULAR STRUCTURE AND THE PREPARATION THEREOF

FIELD OF THE INVENTION

The present invention relates to a brominated epoxy resin having excellent electrical properties (low dielectric constant/low dissipation factor), superior fire retardance and good thermal stability, which is used in the production of glass fiber laminates, the brominated epoxy resin is mixed with commonly used curing agents, such as: dicyandiamide, phenol type phenol-aldehyde resin (so-called phenolic resin or Phenol Novolac, abbreviated as PN), melamine phenolic resin (Melamine Phenol Novolac, abbreviated as MPN), bisphenol A type phenolic resin (Bisphenol A Novolac, abbreviated as BN) and tetraphenyl ethane resin (abbreviated as TPE,), and the curing promotion agent to become a resin varnish composition, then the production of glass fiber laminates is conducted, as compared with the glass laminate made from a general purpose brominated bisphenol A type epoxy resin, the fiberglass laminates made from the present inventive brominated epoxy resin shows better electrical properties and thermal stability and fire retardance which passes the UL94 V-0 test, suitable for high-speed high-frequency signal transmission applications.

BACKGROUND OF THE INVENTION

The general purpose brominated bisphenol A epoxy resin is a mature product for a long time, characterized in that after the long-term research and adjustment, the fiberglass laminate produced from the brominated bisphenol A epoxy resin shows good mechanical properties, electrical properties, dimension stability and other properties; it exhibits superior adhesion to glass, copper and other materials, so the stacked fiberglass laminates produced from bisphenol type brominated epoxy resins are widely used in electronic and aerospace industries.

The electrical properties of printed circuit board materials depend on the three major composites: (1) brominated epoxy resin, (2) filler (3) reinforcement material. As for the resin system, the substrate board with the specifications of FR-4 (Tg 140° C.) made from a current general purpose brominated bisphenol A type epoxy resin (such as Nan Ya Plastics Corporation's NPEB454A80) and glass fiber (E glass) shows about 4.6 Dk value which is unable to meet the requirements in the field of a high-speed high-frequency signal transmission, while new materials, such as BT (bismelaimide-triazene), cyanate ester, PTFE (poly tetra-fluoroethane), are introduced one after another into the application area, but various systems have its advantages and disadvantages, such as the fluorine resin PTFE shows low dielectric constant, low dissipation factor, low water absorption, but has shortcomings e.g. low Tg, high prices, poor processabilty, bad adhesion with copper foil; generally speaking, new materials used in the production process of fiberglass laminates and the production process of fiberglass laminates turned into printed circuit boards, the deviation between its processing conditions and conventional fiberglass laminates is too much to be widely used.

Technical Issues to be Solved

The trends of printed circuit board applications are light, thin, short, small, and the high-speed high-frequency development tendency; but the use of fiberglass laminate materials does not meet the requirements, resulted in a high-speed high-frequency signal severe attenuation during the transmission process, so the fiberglass laminate materials used in this field must have electrical characteristics of a lower dielectric constant and a low dissipation factor, and must be consistent with the existing processing equipment and with the operating requirements under the conditions of the existing process, thus to develop a new resin material to meet a number of needs for the fiberglass laminate production at the same time has become an important issue to be overcome for those of skill in the art.

The Technical Means to Solve Issues

In view of the above issues, the present invention relates to the synthesis of a brominated epoxy resin, wherein a high symmetric or saturated heterocyclic aliphatic molecular structure etc. is introduced during the synthesis of the brominated epoxy resin, so that resulted molecular structure of the brominated epoxy resin possesses a low "molecular dipole moment" characteristic, which can effectively lower dielectric constant and dissipation factor of the fiberglass laminate, in line with the requirements of reducing the signal attenuation during the high-speed high-frequency signal transmission. At the same time, when the inventive brominated epoxy resin and the current brominated bisphenol A type epoxy resin are used in the impregnation, lamination, etc. for fiberglass laminates manufacture, all the production process, production conditions and the down-stream circuit board production process, production conditions are similar, using the existing processing equipments and production conditions, an efficient mass production can be conducted in line with the fiberglass laminates requirements for the high-speed high-frequency signal transmission with a low signal loss and a good processability.

THE DETAILED DESCRIPTION OF THE INVENTION

The brominated epoxy resin of the invention is characterized in that a high symmetric or saturated heterocyclic aliphatic molecular structure is introduced during the synthesis of the brominated epoxy resin, so the fiberglass laminates resulted from the inventive brominated epoxy resin shows excellent electrical properties such as a low dielectric constant and a low dissipation factor, especially suitable for the high-speed high-frequency signal transmission.

The brominated epoxy resin of this invention is prepared by the following steps:
1. A phenolic compound (A) having a symmetrical molecular structure, for example, 2,6-methyl substituted phenol (2,6-xylenol, another name: 2,6-dimethyl phenol) is reacted with aldehydes or aliphatic heterocyclic diene compounds (B) to synthesize a bisphenol type phenol-aldehyde resin (C) having a high symmetry or saturated aliphatic heterocyclic structure;
2. An epoxidation reaction between the bisphenol type phenol-aldehyde resin (C) and epichlorohydrin (ECH) is carried out to form a phenol-aldehyde epoxy resin (D);

3. The phenol-formaldehyde epoxy resin (D) is reacted with a bromine containing phenolic compound (E) to obtain the inventive brominated epoxy resin (F);

wherein the synthesis of the phenol-formaldehyde epoxy resin (D):

The condensation reaction of 2,6-substituted monophenolic compounds, such as dimethyl phenol (2,6-xylenol) and aldehydes or cyclic diene compounds is conducted in the presence of acid catalyst (such as methyl sulfonic acid, toluene sulfonic acid, boron trifluoride, aluminum trichloride) to acquire a phenol-aldehyde resin (C). the phenol-aldehyde resin (C) and epichlorohydrin (ECH) are reacted in the presence of NaOH to synthesize an epoxy resin, in which synthetic reaction conditions are the same as the conventional epoxidation process of epichlorohydrin, the resulted phenol-aldehyde epoxy resin (D) has an average functional group value=2; wherein the synthesis of the brominated epoxy resin (F):

Reactants contain 50~80 w/w % of a phenol-aldehyde epoxy resin (D) and 20~40 w/w % a brominine containing phenolic compound (E), and (D) is reacted with (E) to secure a novel brominated epoxy resin (F).

The reaction steps for the aforementioned new brominated epoxy resin (F) include: (1) the reactants are fully dissolved in 90~120° C.; (2) a catalyst is added, in which the catalyst is mainly based on the three types of tertial phosphate salts, quaternized phosphorus salts or imidazole, the dose of catalyst relative to the brominated phenolic compound (E) is 0.1~1 wt %; (3) The synthesis reaction temperature is 150~200° C., in which the optimal reaction temperature is 160~180° C., and the reaction time is 120~180 minutes.

The structure of the phenol-aldehyde epoxy resin (D) is as follows:

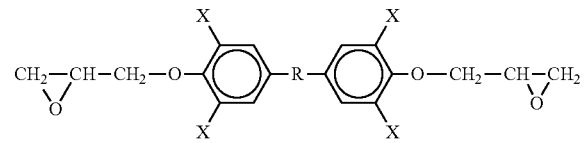

X can be represented by the following chemical formula:

$-CH_3, -C_2H_5, -C(CH_3)_3$

R can be represented by the following chemical formula:

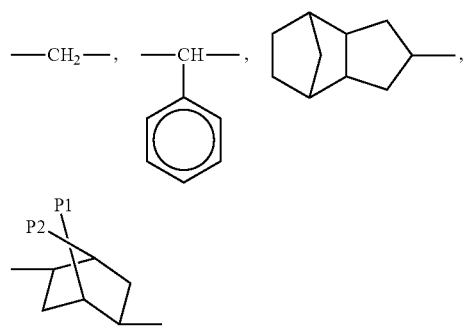

and $P_1$, $P_2$ can be H, $-CH_3$, $-C_2H_5$, etc. respectively.

This phenol-aldehyde epoxy resin (D) is reacted with the brominated phenolic compound (E), and the synthesized product has epoxy equivalent EEW=340~540 g/eq, number of repeated units n=1~4, average molecular weight Mw=1500~3500, bromine content=12~19% based on the novel bifunctional brominated epoxy resin (F).

The structure is as following:

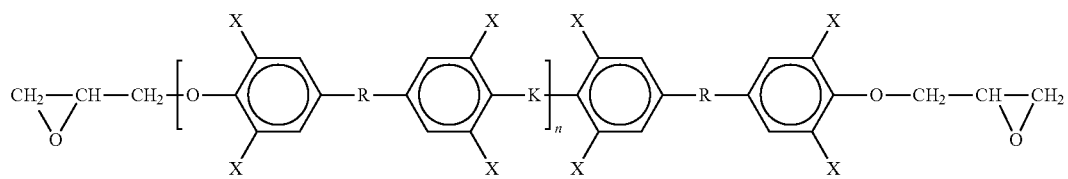

wherein n=1~4, K can be represented by the following chemical formula:

Its synthesis examples will be described in detail as following:

Synthesis of a Brominated Epoxy Resin (F-1)

Step 1: In a 2 L four-neck glass reaction vessel with heating jackets, temperature control devices, an electric mixer, and a condenser, 1200 grams of 2,6-dimethyl phenol (2,6-xylenol) and 150 grams of paraformaldehyde (92% purity) are added and dissolved in the solvent methyl isobutyl ketone (MIBK) at 60° C., after 40 grams of p-benzyl sulfonic acid catalyst is added, the reaction temperature is raised to 90° C. for 2.5 hours reaction, the resulted mixture is neutralized with NaOH and wherein MIBK solvent is removed, to procure 2,6-dimethyl-phenolic resin (resin code: C-1).

Step 2: In a 2 L four-neck glass reaction vessel with heating jackets, temperature control devices, an electric mixer, and a condenser, 400 grams of C-1 is reacted with 1400 grams of epichlorohydrin (ECH) in an alkaline environment for the conduction of the epoxidation at the reaction temperature of 65° C. for 3 hours reaction time, the resulted mixture is filtered to remove by-product NaCl, and vacuumed to remove excess ECH, then 2,6-dimethyl phenol-aldehyde epoxy resin (EEW=185~220 (g/eq), resin code: D-1) is obtained.

Step 3: In a 2 L four-neck glass reaction vessel with heating jackets, temperature control devices, an electric mixer, and a condenser, 1200 grams of D-1 and 450 grams of tetrabromo-bisphenol-A (TBBA) are added and dissolved at 110° C., 2.2 g of triphenyl phosphine catalyst is introduced and reacted at 160° C. for 4 hours, the brominated epoxy resin (EEW=340~450 (g/eq), resin code: F-1) is produced.

Synthesis of the Brominated Epoxy Resin (F-2)

Step 1: In a 2 L four-neck glass reaction vessel with heating jackets, temperature control devices, an electric mixer, and a condenser, 900 grams of 2,6-dimethyl phenol (2,6-xylenol) and 450 grams of isoprene (dicyclopentadiene, DCPD) are incorporated and mixed/dissolved in the solvent methyl isobutyl ketone (MIBK) at 60° C., 40 grams of benzyl sulfonic acid catalyst is introduced with heating to 120° C. to react for 4 hours, the resulted mixture is neutralized with NaOH and wherein the solvent is removed, 2,6-dimethyl phenolic resin (resin code: C-2) is produced.

Step 2: In a 2 L four-neck glass reaction vessel with heating jackets, temperature control devices, an electric mixer, and a condenser, 480 grams of C-2 and 1200 grams of ECH are charged and the epoxidation is conducted in an alkaline environment at reaction temperature 65° C. for 3 hours, the by-product NaCl is filtered and removed, and then excess ECH is vacuum removed, the 2,6-dimethyl phenol-aldehyde epoxy resin (EEW=260~300 (g/eq), resin code: D-2) is gained.

Step 3: In a 2 L four-neck glass reaction vessel with heating jackets, temperature control devices, an electric mixer, and a condenser, 1400 grams of D-2 and 360 grams of tetrabromo-bisphenol-A (TBBA) are fed and dissolved at 110° C., 2.2 g of triphenyl phosphine catalyst is introduced to react at 160° C. for 4 hours, the brominated epoxy resin (EEW=430~540 (g/eq), resin code: F-2) is manufactured.

In the above-mentioned synthesis examples F-1 and F-2, during the preparation step 1 of symmetrical brominated epoxy resin, the choice of phenolic compounds is mainly based on the formation of the symmetrical structure, generally 2,6-disubstituted phenols is primary choice, such as 2,6-dimethyl phenol (2,6-xylenol), 2,6-ditert-butyl phenol, etc. wherein 2,6-methyl phenol is the best; the choice of aldehyde compounds or compounds with double bond is of no special requirements, but it is preferably able to react to form symmetrical phenols, wherein the best aldehyde is formaldehyde or benzaldehyde, and the best double bond compounds are dicyclopentadiene and 2,5-norbornadiene. In the preparation step 3 for the symmetrical brominated epoxy resin, the brominated phenols used are without special restrictions, wherein tetrabromobisphenol-A (TBBA) with a high bromine content is the best.

The preparation of an epoxy resin varnish bromide composition for low dielectric fiberglass laminates includes the following 4 major components: (a) brominated epoxy resin; (b) curing agent; (c) curing promoter and (d) organic solvents, wherein (a), (b), (c) and (d) are homogenously mixed at a appropriate proportion to produce the brominated epoxy resin varnish composition.

The ingredients (b) of brominated epoxy resin varnish composition is a curing agent which includes the following types: (1) phenolic resins, such as phenol-type phenolic resin (Phenol Novolac, referred as PN), melamine phenolic resin (Melamine Phenol Novolac, referred as MPN), bisphenol A type phenolic resin (Bisphenol A Novolac referred as BN) and Tetra phenyl ethane resin (referred as TPE)), (2) Polyvalent amines, (3) polyvalent carboxylic acids, (4) dicyanodiamide, (5) anhydrides and so on.

When dicyanodiamide is used as a curing agent, the dose of dicyanodiamide is 2~8 phr, most preferably 2~4 phr; while phenolic resin (Novolac) is used as a curing agent, the dose of phenolic resin is based on that the equivalent ratio of phenolic OH group to epoxy group equivalent ratio is 0.5~1.5, and the most suitable equivalent ratio is 0.9~1.1.

The ingredient (c) in the brominated epoxy resin varnish composition is curing promoter, which includes the following types: tertial phosphine, tertial amine, quaternary phosphonium salt, quaternary ammonium salt, imidazole compound, wherein the tertial phosphine includes: triphenyl phosphine and so on; the tertial amine includes: trimethylaniline, triethylamine, tributylamine, dimethyl amine ethanol and so on; the quaternary phosphonium salt includes:halogenated quaternary phosphonium salt such as tetrabutyl brominophosphonium, tetraphenyl brominophosphonium, ethyl triphenyl brominophosphonium, propyl triphenyl chlorinophosphonium, butyl triphenyl brominophosphonium and so on; the quaternary ammonium salt includes: halogenated quaternary ammonium salt, such as tetra-methyl ammonium bromide, tetra-ethyl ammonium bromide, tetra-butyl ammonium bromide, triethyl benzyl ammonium bromide, triethyl phenethyl ammonium bromide and so on; imidazole compounds includes: 2-methyl imidazole, 2-ethyl imidazole, 2-lauryl imidazole, 2-benzyl imidazole, 4-methyl imidazole, 4-ethyl imidazole, 4-lauryl imidazole, 2-ethyl-4-methyl imidazole, 2-ethyl-4-methylol imidazole and so on, wherein the most suitable one is 2-methyl imidazole or 2-ethyl-4-methyl imidazole. This promoter may the employed individually or its mixture of more than 2 kinds is used at the same time, the dose thereof is 0.01~1 PHR, and the optimal dose is 0.04~0.5 PHR based on total resin quantity (brominated epoxy resin (a)+ curing agent (b)).

The ingredient (d) in the brominated epoxy resin varnish composition is the organic solvent, which includes aromatic organic solvent, protic solvent, ketone solvent, ether solvent and ester solvent, among them, the suitable solvents contain toluene, N,N-dimethyl formamide, acetone, methyl ethyl ketone, 1-methoxy-2-propyl alcohol, ethyl acetate and so on. The major function of organic solvents is to dissolve ingredients (a) (b) (c) to achieve an uniform mixing effect and to adjust the resin varnish viscosity to facilitate the manufacturing of the fiberglass laminate.

The preparation process of fiberglass laminates contains:
step 1: the preparation of the brominated epoxy resin varnish composition, including (a) a brominated epoxy resin, the content thereof is 20~80 wt %; (b) curing agent, the content is 1~50 wt %; (c) a curing promoter, its amount is 0.01~1 PHR based on total resin quantity (brominated epoxy resin (a)+ curing agent (b)) and (d) an organic solvent, its amount is 30~40 PHR based on the total resin quantity (brominated epoxy resin (a)+curing agent (b)), the four ingredients of (a) (b) (c) and (d) are mixed evenly to complete the varnish composition preparation;

step 2: the preparation of prepreg: a fiberglass cloth is soaked in the resin varnish composition prepared in step (1) for 1~3 minutes, the resin-soaked fiberglass cloth is put in an 170° C. drying oven for 3~8 minutes to heat-eliminate ingredient (d)—organic solvent, the resulted cloth is taken out from the drying oven for settlement to cool, thus the prepreg is obtained, step 3: The thermo-compression formation of fiberglass laminates: many prepregs are piled up one on top of another to become a multi-layered sheet, then copper foil is put in one or both sides of the multi-layered sheet, the resulted composite is put in the thermal press for a compression heating to cause its reaction hardening formation, thereby fiberglass with various superior characteristics is obtained.

The curing (hardening) temperature of this epoxy resin varnish composition may be 30 to 300° C., preferably 150 to 210° C.; if the curing temperature is too low, the curing speed is too slow, the curing time must be lengthened, thus it does not conform to the production efficiency; while if the curing temperature is too high, the resin is easy to decompose, thus the physical property of fiberglass laminates will be deteriorated.

EXAMPLES

The present invention will be described in detail below with reference to numerous embodiments, the various code numbers and the ingredients used in examples and comparative examples are explained as follows:

Brominated epoxy resin a1: brominated epoxy resin produced by Nan Ya Plastics Corporation, trade name NPEB-485A80, its epoxy equivalent is situated between 385 g/eq and 405 g/eq, and the bromine content is 19%.

Curing agent b1: dicyanodiamide (DICY) solution which is prepared by dissolving 14.7 grams dicyanodiamide in 85.3 grams N,N-dimethyl formamide (DMF).

Curing agent b2: bisphenol-A phenolic resin produced by Nan Ya Plastics Corporation, trade name BN.

Curing agent b3: tetra-phenolic ethane type phenolic resin produced by Nan Ya Plastics Corporation, trade name TPE.

Promoter c1: 2-methyl imidazole (2-MI) solution made by dissolving 14.2 grams 2-MI in 85.8 grams N,N-dimethyl formamide (DMF).

Examples 1~6

A symmetry brominated epoxy resin is used with different curing agents, its formulations are detailed in Table (1), acetone is applied to adjust a 65% solid content for the resin varnish composition; the fiberglass laminates is prepared by the well-known method. This method includes that #7628 fiberglass cloth is soaked in the above resin varnish composition, then dried at 170 (the dipping machine temperature) for several minutes, thus a prepreg with 4,000~10,000 poise melt viscosity is obtained via adjusting & controlling the drying time, finally 8 prepregs are stacked layer upon layer and sandwiched in two copper foils with 35-um thickness, then thermo-compression is conducted under the 25 kg/cm² pressure at the controlled temperature raising programming as follows to obtain fiberglass laminates

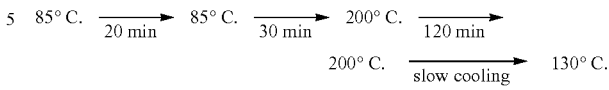

Comparative Example 1~3

The brominated epoxy resin (Nan Ya's brominated epoxy resin, commodity name NPEB-485A80) is used with different curing agents, the composition of this resin varnish is listed in detail in Table (1), acetone is applied to adjust a 65% solid content for the resin varnish composition; Following the same steps as Example 1~6, fiberglass laminates are prepared.

[Measurement Explanation]

1. Varnish Gel Time, VGT:
   The gel time may be an index of the resin varnish reactivity speed, the test method is to take approximately 0.3 ml of the epoxy resin varnish composition and drop on the hot plate at the temperature of 170° C., then to record to the colloidization time needed, which is the so-called VGT.

2. Glass Transition Temperature Determination:
   It is determined by Differential Scanning Calorimeter (DSC) at a heating rate of 20° C./min.

3. Water-Absorptivity Test:
   The water-absorptivity test method includes that the fiberglass laminate with copper foils is washed with an aqueous ferric chloride solution to remove the surface copper foils, cut into 5 cm×5 cm square specimens, dried in an oven at 105° C. for 2 hr, then put in a steam pressure cooker at the condition of 2 atm×120° C. for 30 min, the water-absorptivity is the weight difference between before and after pressure cooker conditioning, then divided by the original weight of the specimen.

4. Dielectric Constant Test:
   The test method includes that the 5 cm×5 cm square specimen of the fiberglass laminate with copper foils removed is put in a drying oven at 105° C. for 2 hr, then the specimen thickness is measured with a thickness gauge. Finally the specimen is inserted in the a dielectric constant instrument, the average of three spots data is the desired value.

5. Dissipation Factor Tests:
   The test method includes that the 5 cm×5 cm square specimen of the fiberglass laminate with copper foils removed is put in a drying oven at 105° C. for 2 hr, then the specimen thickness is measured with a thickness gauge. Finally the specimen is inserted in the a dissipation factor instrument, the average of three spots data is the desired value.

TABLE I

The resin varnish composition and the glass fiber laminate properties

| | | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Resin Varnish Composition (weight %) | 1. Brominated epoxy resin F-1 | 97 | 78 | 78 | — | — | — | —40 | — | — | — |
| | 2. Brominated epoxy resin F-2 | — | — | — | 98 | 82 | 82 | —40 | — | — | — |

TABLE I-continued

The resin varnish composition and the glass fiber laminate properties

|  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
|  | 3. Brominated epoxy resin a-1 | — | — | — | — | — | — | — | 97 | 80 | 80 |
|  | 4. Curing agent b1 | 3 | — | — | 2 | — | — | — | — 3 | — | |
|  | 5. Curing agent b2 | — | 22 | — | — | 18 | — | 20 | — | 20 | — |
|  | 6. Curing agent b3 | — | — | 22 | — | — | 18 | — | — | — | 20 |
|  | 7. Promoter c1 (PHR) | 0.09 | 0.11 | 0.12 | 0.11 | 0.14 | 0.13 | 0.13 | 0.08 | 0.10 | 0.12 |
| Fiberglass Laminate Properties | 1. Varnish gel time (sec) | 380 | 364 | 372 | 395 | 375 | 368 | 368 | 367 | 345 | 358 |
|  | 2. Glass transition temperature (° C.) | 150 | 148 | 154 | 155 | 153 | 156 | 150 | 152 | 150 | 153 |
|  | 3. Water-absorptivity (%) | 0.26 | 0.24 | 0.22 | 0.27 | 0.23 | 0.25 | 0.23 | 0.29 | 0.25 | 0.26 |
|  | 4. Dielectric constant (1 GHz/1 MHZ) | 4 | 4.12 | 3.98 | 4.28 | 4.29 | 4.12 | 4.2 | 4.9 | 4.8 | 4.8 |
|  | 5. Dissipation factor (1 GHz/1 MHZ) | 0.022 | 0.02 | 0.016 | 0.021 | 0.02 | 0.018 | 0.02 | 0.03 | 0.028 | 0.025 |

1. As can be seen from the above test result, the fiberglass laminates made of the bromination epoxy resin (F-1, F-2) show obviously lower dielectric constant, lower dissipation factor, thus is suitable especially for the application of the high speed high frequency signal transmission.

2. In comparison with Nan Ya's brominated epoxy resin, commodity name NPEB-485A80, the fiberglass laminates made of the bromination epoxy resin (F-1) show obviously lower dielectric constant of 0.68~0.9, the range to be down with 14~18%, lower dissipation factor of 0.008~0.009, the range to be down with 26~36%.

3. In comparison with Nan Ya's brominated epoxy resin, commodity name NPEB-485A80, the fiberglass laminates made of the bromination epoxy resin (F-2) show obviously lower dielectric constant of 0.51~0.68, the range to be down with 10~14%, lower dissipation factor of 0.007~0.009, the range to be down with 26~30%.

What we claimed is:

1. A process for the preparation of a brominated epoxy resin with a symmetric or saturated heterocyclic alphatic molecular structure, wherein the process includes the following steps:
   (i) 2,6-substituted symmetric monophenol compound (A) is reacted with an aldehyde compound or a cyclodiene compound (B) at the presence of an acidic catalyst to form a bisphenol type phenol-aldehyde compound (C) with a symmetrical structure or saturated ring structure;
   (ii) an epoxidation is carried out by reacting the resulted bisphenol type phenol-aldehyde compound (C) with epichlorohydrin to form a phenol-aldehyde epoxy resin (D); and
   (iii) the phenol-aldehyde epoxy resin (D) is reacted with a bromine containing phenolic compound (E) to produce a brominated epoxy resin (F).

2. The process for the preparation of a brominated epoxy resin with a symmetric or saturated heterocyclic alphatic molecular structure as claimed in claim 1, characterized in that it possesses the structure as follows:

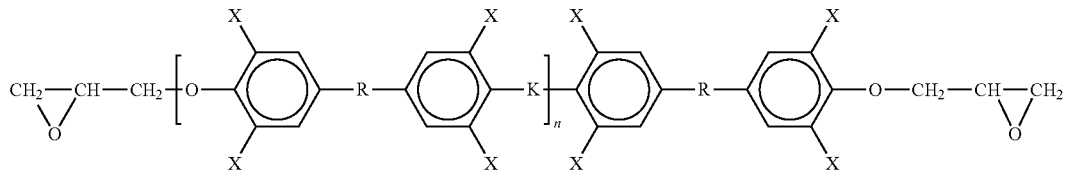

wherein

X: —CH$_3$, —C$_2$H$_5$, —C(CH$_3$)$_3$

R:

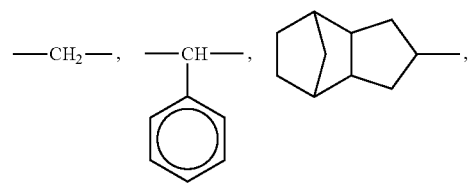

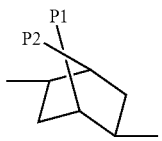

in which P₁/P₂ are H, —CH₃, —C₂H₅ etc.,

K:

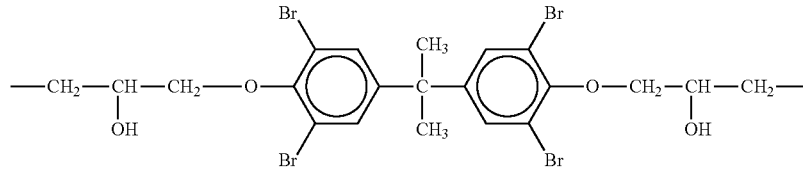

and n=1~4.

3. The process for the preparation of a brominated epoxy resin with a symmetric or saturated heterocyclic alphatic molecular structure as claimed in claim 1, wherein the epoxy equivalent is 340~540 g/eq; the weight average molecular weight is 1500~3500; and the bromine content is 12~19%.

4. The process for the preparation of a brominated epoxy resin with a symmetric or saturated heterocyclic alphatic molecular structure as claimed in claim 1, wherein 2,6-substituted symmetric monophenol compound (A) is 2,6-dimethyl phenol (2,6-xylenol),2,6-diethyl phenol and 2,6-ditert-butyl phenol.

5. The process for the preparation of a brominated epoxy resin with a symmetric or saturated heterocyclic alphatic molecular structure as claimed in claim 1, wherein the aldehyde compound is formaldehyde or benzaldehyde or its mixture.

6. The process for the preparation of a brominated epoxy resin with a symmetric or saturated heterocyclic alphatic molecular structure as claimed in claim 1, wherein the cyclodiene compound is dicyclopentadiene or 2,5-norbornadiene.

7. The process for the preparation of a brominated epoxy resin with a symmetric or saturated heterocyclic alphatic molecular structure as claimed in claim 1, wherein the bromophenol compound is tetrabromobisphenol.

8. An epoxy resin varnish composition with a symmetric or saturated heterocyclic alphatic molecular structure used in fiberglass laminates includes (i) 20~98 percent by weight of the brominated epoxy resin as claimed in claim 1; (ii) 1~50 percent by weight of a curing agent; and (iii) 0.01~1 resin percent by weight of a curing promoter, wherein the percentage is based on total resin quantity (brominated epoxy resin (a)+curing agent (b)).

\* \* \* \* \*